United States Patent Office 3,312,741
Patented Apr. 4, 1967

3,312,741
2,2-DIALKYL-3-ALKOXY CYCLOBUTANONE DERIVATIVES
James C. Martin, Kingsport, Tenn., assignor to Eastman Kodak Company, Rochester, N.Y., a corporation of New Jersey
No Drawing. Filed Apr. 29, 1963, Ser. No. 276,177
7 Claims. (Cl. 260—586)

This invention relates to organic chemistry. More particularly this invention relates to novel organic compounds that are useful as plasticizers and to a novel method for preparing these and other organic compounds.

The novel compounds of the invention are hydrocarbyloxy substituted cyclobutanones of the formula:

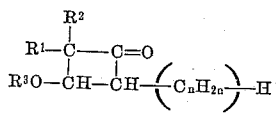

wherein each of $R^1$ and $R^2$ is saturated hydrocarbyl radical, $R^3$ is a hydrocarbyl radical free of acetylenic unsaturation and having at least 4 carbon atoms, $n$ is an integer from 0 to about 4 and $R^1$, $R^2$ and $R^3$ together contain at least 8 carbon atoms; more specifically:

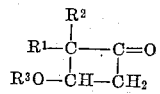

The saturated hydrocarbyl radicals $R^1$ and $R^2$ are alkyl or cycloalkyl radicals and preferably contain from 1 to about 8 carbon atoms each. In addition the hydrocarbyl radicals $R^1$ and $R^2$ can collectively represent an alkylene group which, together with the carbon atom to which they are attached, form a saturated carbocyclic ring of 5 to 6 ring carbon atoms, e.g., as in pentamethyleneketene and tetramethyleneketene. Typical of the saturated hydrocarbyl radicals which $R^1$ and $R^2$ can be, are methyl, ethyl, propyl, i-propyl, n-butyl, i-butyl, cyclobutyl, pentyl, hexyl, cyclohexyl, 2-ethylhexyl, n-octyl, tetramethylene, pentamethylene, etc.

The hydrocarbyl radical $R^3$ in the novel compounds of the invention can be any such radical free of acetylenic unsaturation and having more than 4 carbon atoms and is preferably such a hydrocarbyl radical of 4 to about 20 carbon atoms. Examples of the hydrocarbyl radical $R^3$ include alkyl radicals such as n-butyl, i-butyl, pentyl, hexyl, 2-ethylhexyl, n-octyl, nonyl, decyl, pentadecyl, octadecyl, eicosyl, etc.; cycloalkyl radicals such as cyclobutyl, cyclopentyl, cyclohexyl, etc.; alkenyl radicals such as butenyl, pentenyl, hexenyl, decenyl, etc.; and aromatic radicals preferably mononuclear aromatic radicals such as phenyl, benzyl, tolyl, etc.

The value of the integer $n$ is 0 or 1 in certain preferred embodiments of the invention.

The novel compounds of the invention of lower molecular weight are unexpectedly useful as plasticizers for a wide variety of polymeric plastic materials. The higher molecular weight compounds within the scope of the invention, e.g., those in which the substituents $R^1$ and $R^2$ have more than 8 carbon atoms or $R^3$ has more than 20 carbon atoms, are suitable as waxy coating materials, e.g., for wood, paper, etc.

A convenient method of incorporating the novel compounds of the invention into the polymeric material is to mill the two together on hot rolls. Other methods, well known in the art, are equally useful.

The novel plasticized compositions thus comprise a normally solid polymeric plastic material and a plasticizing amount of one or more of the novel compounds of the invention. The exact concentration of the plasticizer depends on the type of polymer being plasticized and the use to which the plasticized polymer will be put. In general, plasticizer concentrations of about 10 parts of plasticizer per 100 parts of polymer give products which are particularly useful.

Preferred compounds for use as plasticizers include 2,2-dimethyl-3-(2-ethylhexyloxy)cyclobutanone, 2,2-dimethyl-3-(octadecyloxy)cyclobutanone, 2,2-dimethyl-3-decyloxycyclobutanone, 2,2-dimethyl-3-menthyloxycyclobutanone, 2,2-dimethyl-3-cyclobutanone, 2-butyl-2-ethyl-3-(i-butoxy)cyclobutanone, and 2,2-dimethyl-3-benyloxycyclobutanone.

The following example illustrates the unusual versatility of the novel compounds of the invention.

Example 1

The compound 2,2-dimethyl-3-(2-ethylhexyloxy)cyclobutanone was incorporated into a poly(vinylchloride) resin, a cellulose acetatebutyrate resin and a cellulose propionate resin at various concentrations by milling the compound and the resin together on hot rolls.

Table I presents a comparison of the properties of the various resins plasticized with 2,2-dimethyl-3-(2-ethylhexyloxy)cyclobutane with the properties of the same resins plasticized with identical concentrations of commerical plasticizers.

TABLE I

| Property | Poly(vinyl chloride) Geon 101EP—50 PHR[1] | | Cellulose Acetate Butyrate | | | | Cellulose Propionate | | | |
|---|---|---|---|---|---|---|---|---|---|---|
| | | | 10 PHR | | 25 PHR | | 10 PHR | | 25 PHR | |
| | Pz[2] | DOP[3] | Pz | DOP | Pz | DOP | Pz | DPB[4] | Pz | DPB |
| Hardness (Durometer) | A₂98 | Z₂95 | R-100 D-76 | R-100 D-77 | R-67 D-73 | R-63 D-72 | R-105 D-78 | R-110 D-80 | R-82 D-74 | R-89 D-75 |
| Tensile Strength (upper yield), 72° F | None | None | 5,120 | 5,100 | 3,430 | 3,370 | 6,210 | 6,400 | 4,320 | 4,080 |
| Tensile Strength (break), 72° F | 3,300 | 2,840 | 4,930 | 4,869 | 4,150 | 4,050 | 5,840 | 5,554 | 4,670 | 4,600 |
| Elongation, 72° F., percent | 295 | 320 | 43 | 46 | 65 | 70 | 42 | 28 | 56 | 55 |
| Modulus of Elasticity | 2,170 | 1,674 | 1.6×10⁵ | 1.68×10⁵ | 1.28×10⁵ | 1.21×10⁵ | 1.92×10⁵ | 1.87×10⁵ | 1.56×10⁵ | 1.47×10⁵ |
| Water Absorption, Percent | 1.17 | 0.17 | 1.87 | 1.49 | 1.61 | 1.16 | 2.28 | 2.09 | 1.85 | 1.52 |
| Material Leached Out, Percent | .1 | .03 | .49 | .46 | .52 | .35 | .56 | .6 | .47 | .43 |

[1] PHR=parts plasticizer per 100 parts resin.
[2] Pz=3-(2-ethylhexyloxy)-2,2-dimethylcyclobutanone.
[3] DOP=dioctylphthalate.
[4] DBP=diisobutylphthalate.

The compounds of the invention and other compounds can be prepared by the process which comprises combining a disubstituted ketene with an unsubstituted or substituted vinylether at a temperature of about 20° C. to about 150° C.

The ketenes which are useful in the practice of the invention are disubstituted ketenes of the formula:

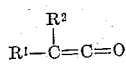

wherein $R^1$ and $R^2$ are the same as discussed hereinbefore.

Preferred ketenes for use in the practice of the invention include, for example, dimethylketene, diethylketene, butylethylketene, i-butylethylketene, dipropylketene, dioctylketene, di(2-ethylhexyl)ketene, tetramethyleneketene, pentamethyleneketene, etc.

The vinyl ethers (by which we mean unsubstituted or substituted) useful in the practice of my invention are compounds of the formula:

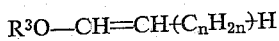

wherein $R^3$ is a hydrocarbyl radical free of acetylenic unsaturation and $n$ is an integer from 0 to about 4.

The hydrocarbyl radical $R^3$ preferably has from 1 to about 20 carbon atoms. Examples of the hydrocarbyl radical $R^3$ include alkyl radicals such as methyl, ethyl, propyl, i-propyl, butyl, i-butyl, pentyl, hexyl, 2-ethylhexyl, octyl, decyl, pentadecyl, octadecyl, eicosyl, etc., cycloalkyl radicals such as cyclobutyl, menthyl, cyclohexyl, etc., alkenyl such as vinyl, allyl, butenyl, pentenyl, hexenyl, decenyl, etc. and aromatic radicals, preferably mononuclear aromatic radicals such as phenyl, benzyl, tolyl, etc.

The interger $n$ preferably has a value of 0 to 1.

The phrase "hydrocarbyl radical" is used herein in its usual sense and includes all monovalent radicals containing only carbon and hydrogen as pointed out, for instance, in U.S. 3,066,148 and U.S. 308,043.

There appears to be no upper limit to the size of the substituents $R^1$, $R^2$ and $R^3$ insofar as the operability of the process is concerned. The tendency of the disubstituted ketene to dimerize is retarded as $R^1$ and $R^2$ increase in size, but the cycloaddition of the disubstituted ketene with the vinyl ether is not excessively retarded.

Examples of preferred unsaturated ethers for use in the process of the invention include 2-ethylhexylvinyl ether, butylvinyl ether, i-butylvinyl ether, n-octadecylvinyl ether, n-decylvinyl ether, menthylvinyl ether, cyclohexylvinyl ether, butyl-1-propenyl ether, ethylvinyl ether, methylvinyl ether, benzylvinyl ether, allylvinyl ether, etc.

The process of the invention is preferably carried out by combining equimolar quantities of the disubstituted ketene and the vinyl ether. In certain instances it is preferred to use an excess of the vinyl ether.

The process can be carried out with or without a solvent. Suitable solvents are those which are inert to the reactants and the product. Typical of solvents which are suitable are aliphatic and aromatic hydrocarbons, esters, ethers, chlorinated aliphatic and aromatic hydrocarbons, etc. Dipolar aprotic solvents such as acetonitrile, dimethylsulfoxide, dimethylformamide and others of the types disclosed in applicant's co-pending application Ser. No. 244,566, filed Dec. 14, 1962 are particularly useful and are normally preferred because they increase the reaction rate.

The reaction time and temperature depend upon the exact nature of the reactants being used. It is preferred to operate at a temperature of from about 20° C. to about 150° C. The exact time required varies according to the reactants and the temperature. In general reaction times of from about ½ hour to about 6 hours are preferred.

The following examples illustrate the preparation of the novel compounds of the invention and the novel process of the invention.

*Example 2*

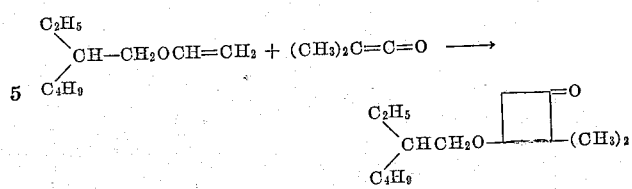

To a stirred solution of 312 g. (2 moles) of 2-ethylhexyl vinyl ether in 1000 ml. of diethyl ether under nitrogen was added 140 g. (2 moles) of dimethylketene. The resulting solution was stirred at room temperature for 6 hours and then distilled through a 12-in. packed column to give 103 g. of recovered vinyl 2-ethylhexyl ether and 253 g. (84%) of 3-(2-ethylhexyloxy)-2,2-dimethylcyclobutanone, B.P. 85° (0.1 mm.), $n_D^{20}$ 1.4419.

*Analysis.*—Calcd. for $C_{14}H_{26}O_2$: C, 74.3; H, 11.5; mol. wt. 226. Found: C, 74.2; H, 11.6; mol. wt. (B.P. elevation in benzene), 225. The infrared spectrum showed an absorption at 5.63μ, characteristic of cyclobutanones.

*Example 3*

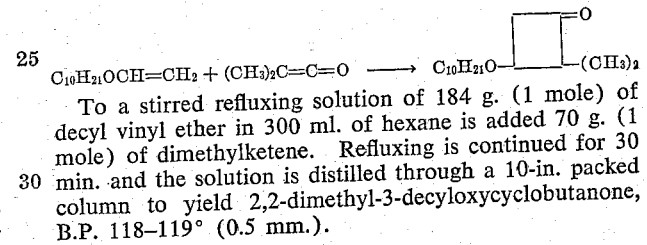

To a stirred refluxing solution of 184 g. (1 mole) of decyl vinyl ether in 300 ml. of hexane is added 70 g. (1 mole) of dimethylketene. Refluxing is continued for 30 min. and the solution is distilled through a 10-in. packed column to yield 2,2-dimethyl-3-decyloxycyclobutanone, B.P. 118–119° (0.5 mm.).

*Example 4*

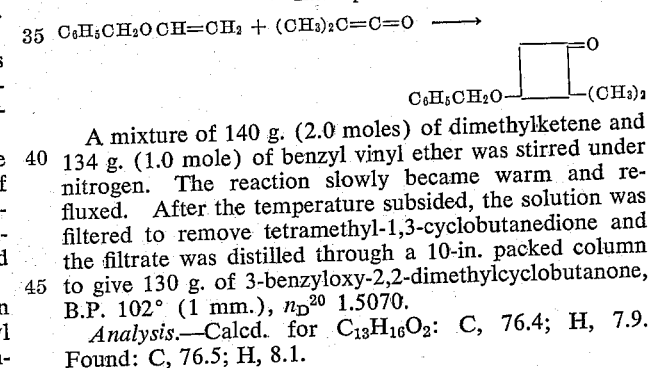

A mixture of 140 g. (2.0 moles) of dimethylketene and 134 g. (1.0 mole) of benzyl vinyl ether was stirred under nitrogen. The reaction slowly became warm and refluxed. After the temperature subsided, the solution was filtered to remove tetramethyl-1,3-cyclobutanedione and the filtrate was distilled through a 10-in. packed column to give 130 g. of 3-benzyloxy-2,2-dimethylcyclobutanone, B.P. 102° (1 mm.), $n_D^{20}$ 1.5070.

*Analysis.*—Calcd. for $C_{13}H_{16}O_2$: C, 76.4; H, 7.9. Found: C, 76.5; H, 8.1.

*Example 5*

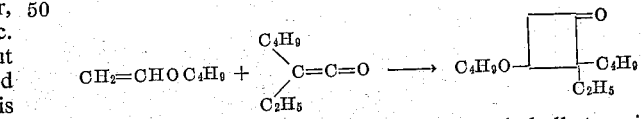

A solution of 252 g. (2 moles) of butylethylketene in 400 g. (4 moles) butyl vinyl ether is refluxed for 24 hours. Distillation of the reaction solution through a 10-in. packed column gives 2-butyl-3-butoxy-2-ethylcyclobutanone.

*Example 6*

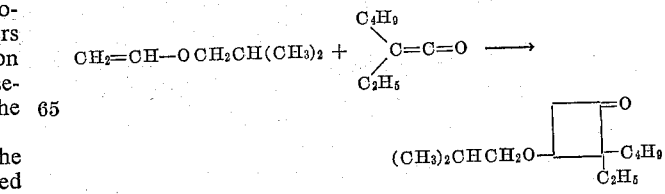

A solution of 126 g. (1 mole) of butylethylketene in 200 g. (2.0 moles) of isobutyl vinyl ether was heated in a stainless steel autoclave at 130° for 3 hours. The reaction solution was distilled through a 10-in. packed column to give a high yield of 2-butyl-3-(isobutoxy)-2-ethylcyclobutanone, B.P. 76–78° (0.5 mm.).

Example 7

The general method described in Example 3 was used to prepare the following 2,2-dialkyl-3-alkoxycyclobutanones from the reactants shown. Yields were good in every case.

| Unsaturated Ether | Dialkylketene | Product | B.P. |
|---|---|---|---|
| n-Octadecyl vinyl ether | Dimethylketene | 2,2-dimethyl-3-(octadecyloxy)-cyclobutenone. | (¹) |
| Menthyl vinyl ether | do | 3-menthyloxy-2,2-dimethylcyclo-butanone. | 105–107° (0.7 mm.) |
| Cyclohexyl vinyl ether | do | 3-cyclohexyloxy-2,2-dimethyl-cyclobutanone. | 80° (2 mm.) |
| 2-ethylhexyl vinyl ether | Butylethylketene | 2-butyl-2-ethyl-3-(2-ethylhexyl-oxy)-cyclobutanone. | 121–123° (0.5 mm.) |
| Isobutyl vinyl ether | do | 2-butyl-3-(isobutoxy)-2-ethyl-cyclobutanone. | 76–78° (0.5 mm.) |
| Do | Diethylketene | 3-(isobutoxy)-2,2-diethylcyclo-butanone. | 68–69° (1.5 mm.) |
| Do | Methylpropylketene | 3-(isobutoxy)-2-methyl-2-propyl-cyclobutanone. | 66–68° (1.5 mm.) |

¹ Molecular distillation.

The following examples illustrate the novel process of the invention.

Example 8

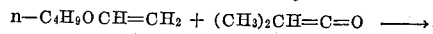
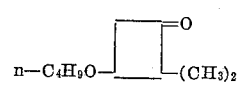

To a stirred solution of 100 g. (1 mole) of butyl vinyl ether in 500 ml. of ethyl ether under nitrogen was added 70 g. (1 mole) of dimethylketene. The reaction solution was stirred at room temperature for several hours and then distilled through a 10-in. packed column to give 24 g. of recovered butyl vinyl ether and 109 g. (85%) 3-butoxy-2,2-dimethylcyclobutanone, B.P. 75–78° (6.5 mm.), $n_D^{20}$ 1.4323.

Analysis.—Calcd. for $C_{10}H_{18}O_2$: C, 70.6; H, 10.6. Found: C, 70.2; H, 10.6. The infrared spectrum showed an absorption at 5.62μ, characteristic of cyclobutanones.

Example 9

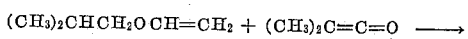
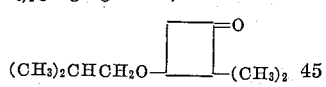

To a stirred, refluxing solution of 100 g. (1 mole) of isobutyl vinyl ether in 300 ml. of hexane was added 70 g. (1 mole) of dimethylketene. Refluxing was continued for 30 min. and the solution was distilled through a 10-in. packed column to give 12 g. of recovered isobutyl vinyl ether and 135 g. (90%) of 3-isobutoxy-2,2-dimethylcyclobutanone, B.P. 78–79° (7 mm.). The infrared spectrum showed a strong absorption at 5.63μ.

Example 10

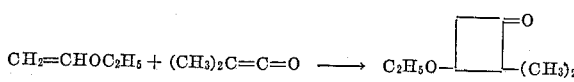

To 960 g. (13.3 moles) of ethyl vinyl ether, stirred under a nitrogen atmosphere, was added 600 g. (8.6 moles) of dimethylketene over a period of 4 hours at 25–30°. The reaction solution was stirred at room temperature for four hours more. Distillation of this solution through a 12-in. Vigreux column gave 315 g. (4.4 moles) of unchanged ethyl vinyl ether and 975 g. (80%) of 3-ethoxy-2,2-dimethylcyclobutanone, B.P. 82–83° (38 mm.), $n_D^{20}$ 1.4270.

Analysis.—Calcd. for $C_8H_{14}O_2$: C, 67.6; H, 9.9. Found: C, 67.8; H, 10.0.

Example 11

To a solution of 72 g. (1 mole) of ethyl vinyl ether in 300 ml. of acetonitrile at 25° was added 70 g. (1 mole) of dimethylketene over a period of 20 min. The reaction was exothermic and required the use of an ice bath to keep the temperature at 30–40°. When no more heat was evolved, the reaction solution was distilled rapidly through a 6-in. Vigreux column to give a high yield of 3-ethoxy-2,2-dimethylcyclobutanone.

Example 12

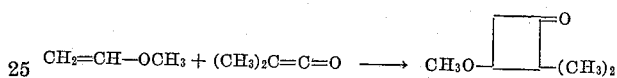

Solutions of 79 lb. of dimethylketene in 100 lb. of hexane and 96 lb. of methyl vinyl ether in 163 lb. of hexane were pumped simultaneously into a reaction vessel over a period of 100 hr. The reaction time was controlled by the rate of production of dimethylketene. The temperature in the reaction vessel was kept at 25–40° and the product was obtained by continuously overflowing the reaction solution into a wiped film molecular still to remove the hexane. Final purification consisted of a distillation through a packed column to give a high yield of 3-methoxy-2,2-dimethylcyclobutanone, B.P. 157°, $n_D^{20}$ 1.4340.

Example 13

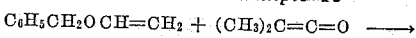
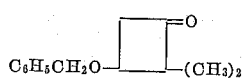

A mixture of 140 g. (2.0 moles) of dimethylketene and 134 g. (1.0 mole) of benzyl vinyl ether was stirred under nitrogen. The reaction slowly became warm and refluxed. After the temperature subsided, the solution was filtered to remove tetramethyl-1,3-cyclobutanedione and the filtrate was distilled through a 10-in. packed column to give 130 g. of 3-benzyloxy-2,2-dimethylcyclobutanone, B.P. 102° (1 mm.), $n_D^{20}$ 1.5070.

Analysis.—Calcd. for $C_{13}H_{16}O_2$: C, 76.4; H, 7.9. Found: C, 76.5; H, 8.1.

Example 14

Butyl-1-propenyl ether was combined with dimethylketene according to the method of Example 3 to yield 2,2,4-trimethyl-3-butoxycyclobutanone, B.P. 60–61° (1.8 mm.).

The invention has been described in considerable detail with particular reference to certain preferred embodiments thereof, but it will be understood that variations and modifications can be effected within the spirit and scope of the invention as described hereinbefore and as defined in the appended claims.

I claim:
1. A compound of the formula:

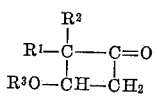

wherein each of $R^1$ and $R^2$ is a saturated hydrocarbyl radical of 1 to 8 carbon atoms, $R^3$ is a hydrocarbyl radical free of acetylenic unsaturation having from 4 to 20 carbon atoms, and $R^1$, $R^2$ and $R^3$ together contain 8 to 20 carbon atoms.

2. A compound of the formula:

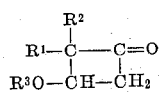

wherein $R^1$ and $R^2$ are selected from the group consisting of methyl, ethyl, propyl, i-propyl, butyl, i-butyl, pentyl, hexyl, 2-ethylhexyl, octyl and pentamethylene; $R^3$ is selected from the group consisting of butyl, i-butyl, 2-ethylhexyl, decyl, octadecyl, menthyl, cyclohexyl and benzyl and $R^1$, $R^2$, and $R^3$ together contain at least 8 carbon atoms.

3. 2,2-dimethyl-3-(2-ethylhexyloxy)cyclobutanone.
4. 2,2-dimethyl-3-decyloxycyclobutanone.
5. 2,2-dimethyl-3-octadecyloxycyclobutanone.
6. 2,2-dimethyl-3-menthyloxycyclobutanone.
7. 2,2-dimethyl-3-cyclohexyloxycyclobutanone.

References Cited by the Examiner

UNITED STATES PATENTS

| | | | |
|---|---|---|---|
| 3,059,030 | 10/1962 | Park et al. | 260—586 |
| 3,100,716 | 8/1963 | Kibler et al. | 106—187 |
| 3,106,580 | 10/1963 | Phillips | 260—586 |
| 3,113,880 | 12/1963 | Hoeschele et al. | 106—187 |
| 3,129,248 | 4/1964 | England | 260—586 |

OTHER REFERENCES

Studinger: "Helv. Chim. Acta.," vol. 7, pp. 19 to 22 (1924).

Adams et al.: "Organic Reactions," vol. 12, pp. 48, 49 (1962).

LEON ZITVER, *Primary Examiner.*

MARCUS LIEBMAN, *Examiner.*

D. J. ARNOLD, M. M. JACOB, *Assistant Examiners.*